Oct. 18, 1966  C. RIZZUTO  3,279,754
ANTI-TIP AND FOUR-WHEEL BRAKE MECHANISM FOR BABY CARRIAGES
Filed Aug. 31, 1964  2 Sheets-Sheet 2
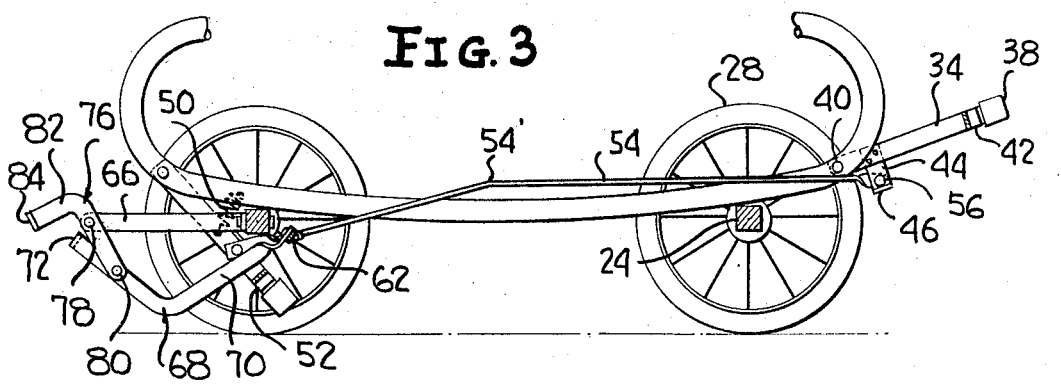
FIG. 3
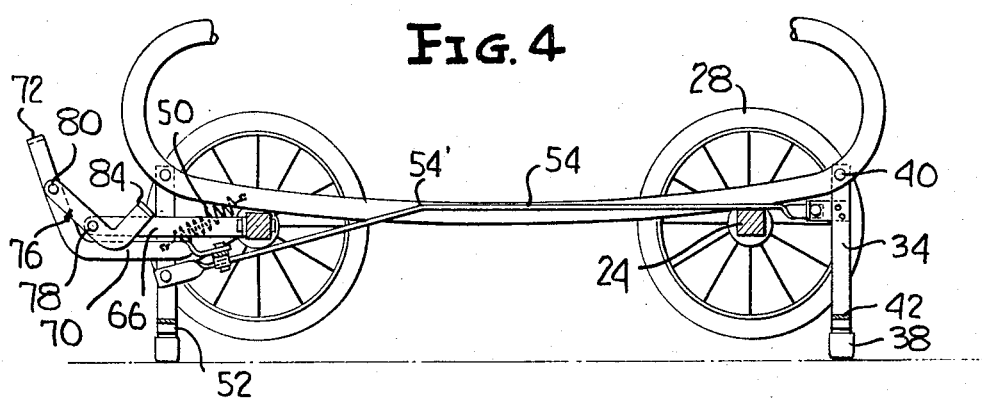
FIG. 4
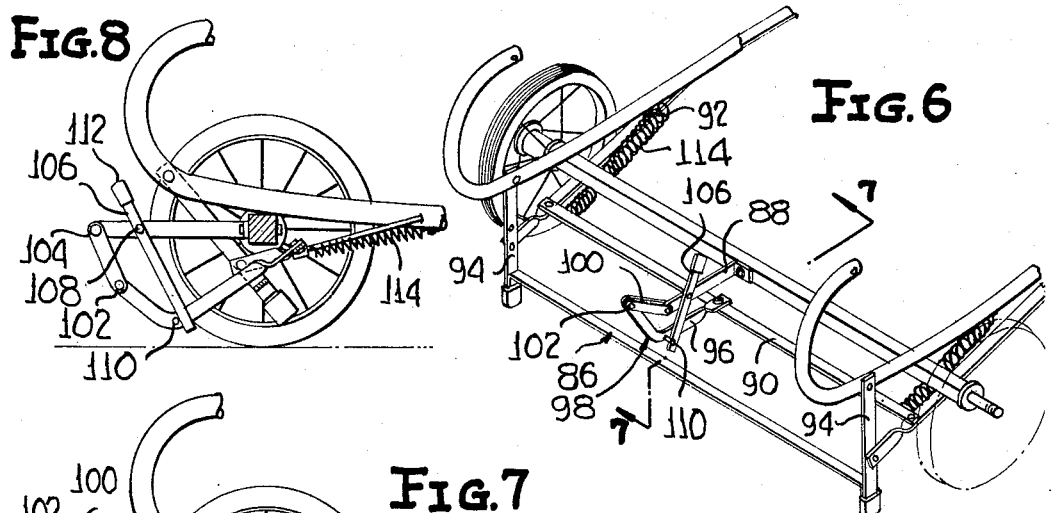
FIG. 8
FIG. 6
FIG. 7
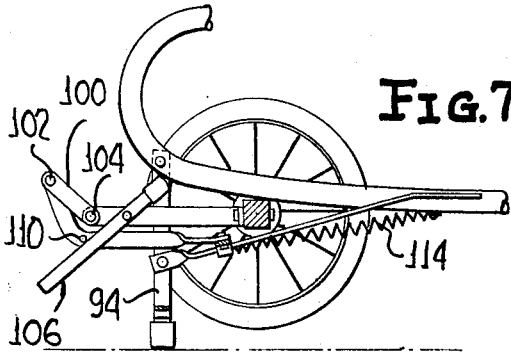
INVENTOR
CHARLES RIZZUTO
BY *Shoemaker and Mattare*
ATTORNEYS

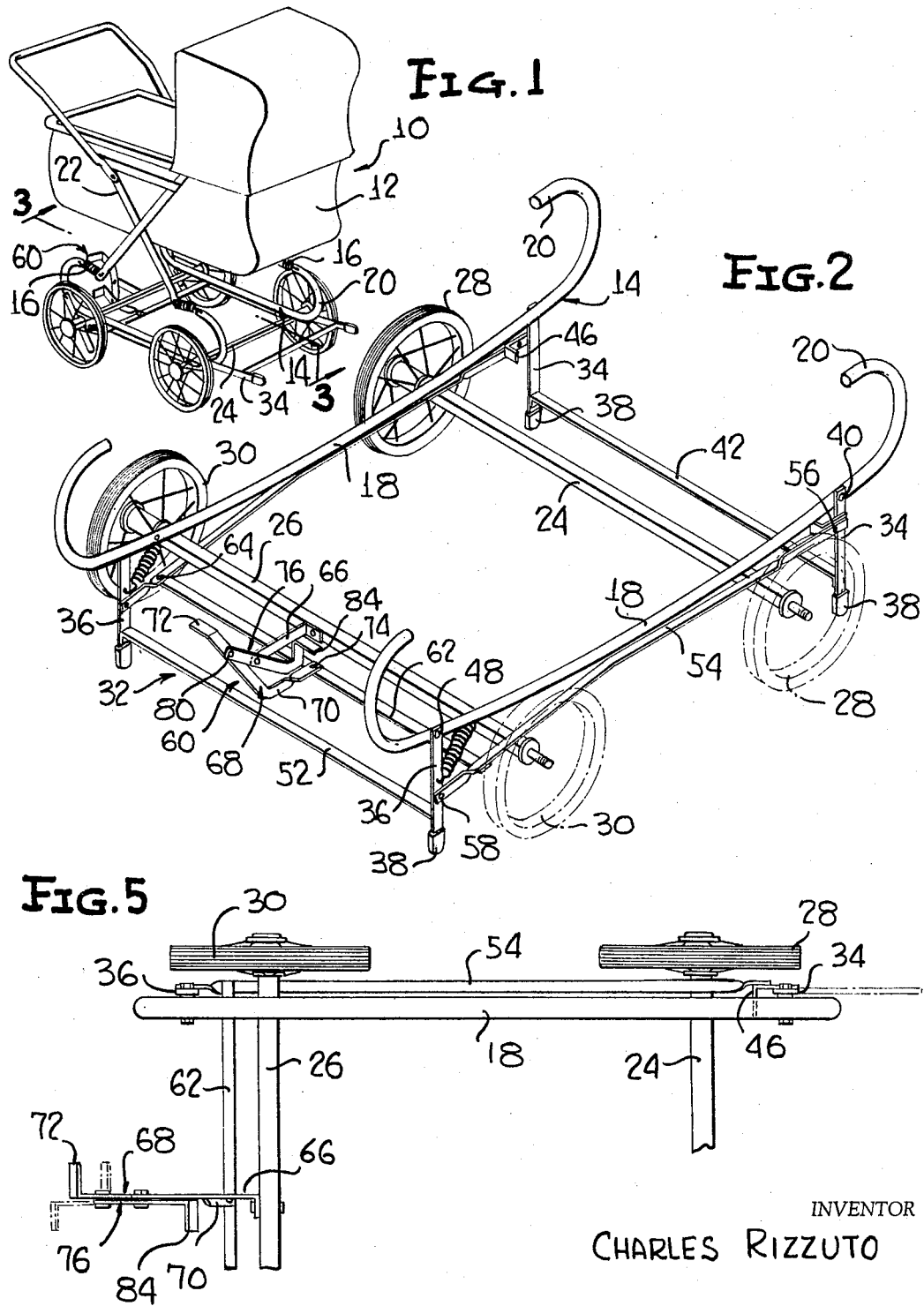

United States Patent Office 3,279,754
Patented Oct. 18, 1966

3,279,754
ANTI-TIP AND FOUR-WHEEL BRAKE MECHANISM FOR BABY CARRIAGES
Charles Rizzuto, Jackson Heights, N.Y., assignor to Anthony Rizzuto, Jackson Heights, N.Y.
Filed Aug. 31, 1964, Ser. No. 393,091
10 Claims. (Cl. 254—86)

This invention relates generally to wheeled vehicles and is directed particularly to an anti-tip and four-wheel brake mechanism designed primarily for baby carriages.

An object of the present invention is to provide a novel mechanism attached to the running gear or chassis of a baby carriage, by means of which the carriage can be easily and quickly secured in stationary position.

A further object of the invention is to provide a mechanism as above described which will resist, when actuated to set or operative position, any side movement or tipping of the carriage and will also hold the carriage firmly in an elevated position so that it cannot be rolled backward or forward on its wheels.

More particularly the mechanism of the present invention is designed to facilitate the raising or elevation of the carriage, to the chassis of which it is attached, so that the wheels of the carriage will be free of contact with the ground and the carriage will be secured or held in the elevated position at locations adjacent to the front and rear wheels thereof.

The invention broadly contemplates the provision of four leg members pivotally attached to the baby carriage chassis, two of such members being at the front of the chassis and two at the rear. These leg members are supported for pivotal or swinging motion on transversely directed pivots whereby they can be moved or swung from elevated to lower positions and vice versa and the leg members are of such length that when they are swung to the lowered position the lower ends thereof, carrying suitable non-slipping tips or feet, will engage the underlying supporting surface and raise the carriage to a sufficient extent to remove the carriage wheels from contact with the underlying support.

At the rear of the carriage a double foot lever assembly is provided, in one embodiment of the invention, by means of which the actuation of the ground engaging legs may be easily effected.

In a modified leg actuating assembly a single lever is provided with novel linkage elements, through the medium of which the desired actuation of the legs can be effected.

The invention will be best understood from a consideration of the following detailed description taken in connection with the accompanying drawings wherein:

FIGURE 1 is a view in perspective of a conventional type of baby carriage showing the present invention, in one embodiment thereof, connected to the chassis frame.

FIGURE 2 is a view in perspective of the chassis frame detached from the carriage body suspension springs and the carriage body and showing the anti-tip and wheel brake mechanism in operative position, two of the carriage wheels being shown in broken outline to avoid obscuring a portion of the mechanism.

FIGURE 3 is a sectional view taken substantially on the line 3—3 of FIGURE 1, showing the mechanism in inoperative position.

FIGURE 4 is a sectional view corresponding to FIGURE 3 but showing the mechanism in operative position in which the legs are vertically disposed to elevate the wheels from the ground and thus function as brakes.

FIGURE 5 is an underside view of a portion of the chassis showing the positions of the levers when the legs are in wheel elevating position.

FIGURE 6 is a perspective view of the rear end of the chassis showing a modified form of the mechanism with the elevating legs in lowered position.

FIGURE 7 is a sectional view taken substantially on the line 7—7 of FIGURE 6.

FIGURE 8 is a sectional view corresponding to FIGURE 7 but showing the legs in inoperative position.

Referring now more particularly to the drawings, the numeral 10 generally designates a conventional type of baby carriage wherein the body 12 is sprung upon the underlying chassis frame 14 by springs 16.

The chassis 14 comprises the tubular side rails 18 which are curved upwardly and toward the central portion of the chassis, at their ends as indicated at 20, the springs 16 being attached to these curved end portions 20 as shown in FIGURE 1 and also being attached to the downwardly extending crossed arms 22 forming a part of the structure of the body 12, there being two of these arms at each side of the body as will be readily understood.

The chassis frame or chassis structure 14 also includes the front and rear transverse axles 24 and 26 respectively which carry the front wheels 28 and rear wheels 30 respectively.

The anti-tip and wheel brake mechanism of the present invention is generally designated 32.

The mechanism 32 includes two front brake legs 34 and two rear brake legs 36.

Each of the brake legs 34 and 36 has upon its lower end the non-slipping foot or tip 38 which may be in the form of a rubber cap or any suitable body of material which will form a non-slipping engagement with the underlying ground surface and while such tip or foot is here shown as a cap in which the lower end of the leg is engaged, obviously it may be formed in any other manner suitable for performing the desired function.

The front legs 34 are attached at their top ends by suitable pivot means 40 to the forward end portions of the side rails 18, in advance of the forward axle 24 as shown, to swing on an axis directed transversely of the frame.

Adjacent to their lower ends the front legs 34 are rigidly connected together by a cross brace bar 42.

Also rigidly secured to each front leg 34, adjacent to the upper end of the same, is a short stop arm 44 which, in the vertical position of the leg 34, is directed rearwardly and the arm terminates in a laterally directed stop finger 46 which extends inwardly and is adapted to engage the underside of the adjacent rail 18 to check the leg 34 from swinging rearwardly beyond its vertical position.

The rear brake legs 36 have upper ends which are pivotally attached to the adjacent chassis rails 18 as indicated at 48 for swinging in a vertical plane on axes directed transversely of the frame. The pivots 48 are disposed rearwardly of the rear axle 26 as shown.

One of the rear legs 36 has attached thereto adjacent to its upper end, one end of a coil spring 50, the other end of the spring being attached forwardly of the leg pivot 48 to the adjacent rail 18. This spring is under constant tension tending to pull or swing the leg upwardly into the inoperative position thereof.

The rear legs 36 are also rigidly coupled together by a cross brace bar 52. Consequently, when the spring 50 functions to pull the attached leg upwardly, the opposite leg will also be drawn up.

While only one actuating spring 50 is illustrated, obviously a similar spring may be attached at the opposite side of the chassis between the other leg 36 and the adjacent frame rail 18, if desired.

Extending longitudinally of the chassis at both sides thereof is the long thrust link 54 which is here shown as being in the form of the flat bar of metal which has its wide or flat faces disopsed horizontally through the major portion of its length. This bar may have a slight degree of resiliency to flex upwardly slightly in the slight bend or angle 54' as may be necessary in the operation of the mechanism.

The forward ends of the thrust links 54 are pivotally attached as at 56 to the stop arms 44.

At their rear ends the links 54 are pivotally attached as at 58 to the adjacent rear legs 36. Thus it will be seen that forward and rearward swinging motion may be transmitted simultaneously to all four of the legs and such motion is effected through the medium of the leverage unit generally designated 60.

The leverage unit comprises a transversely extending thrust bar 62 which is rigidly attached at its ends to the rear end portions of the thrust links 54 by rivets 64 or in any other suitable manner.

Substantially midway of its ends the rear axle 26 has secured thereto the rearwardly extending rigid lever bracket 66.

The numeral 68 designates a release foot lever. This lever has a obtusely angled lower end portion 70 and a laterally projecting top end pedal portion 72.

The portion 70 of the lever 68 is secured at its forward end as at 74, to the thrust bar 62 and in one position extends horizontally rearwardly therefrom whereby the main body portion of the lever than extends at an angle upwardly and rearwardly with the top end pedal portion 72 directed laterally or toward the left side of the chassis as here illustrated.

The numeral 76 generally designates a main lever which is pivotally attached intermediate its ends as at 78 to the rear end of the lever bracket 66 while one end is pivotally attached as at 80 to and intermediate the ends of the release lever 68.

The opposite end of the main lever has the substantially right angularly extending terminal portion 82 which terminates in the laterally directed pedal 84.

In the operation of the mechanism for elevating the carriage wheels from the ground or other underlying surface and locking the carriage against movement, the operator presses the foot against the pedal 84 of the main lever 76 causing this lever to turn or rotate on the pivot 78 and swing the end thereof which is pivoted at 80 to the release lever 68, upwardly. This will effect a rearward pull on the lever 68 which in turn will pull rearwardly on the thrust bar 62 and on the links 54, causing the legs 34 and 36 to swing downwardly toward the underlying supporting surface and bring the feet or tips 38 of the legs into contact with the underlying surface. Due to the closeness of stop arms 44 to the pivots 40 of the forward legs the latter legs will swing downwardly rapidly and effect contact with the underlying surface substantially at the same moment that the feet of the rearward legs engage that surface and the carriage chassis may then be made to ride up on and be elevated by the legs which come into the vertical position in which they are shown in FIGURES 2 and 4.

In the operation thus far described the main lever 76 will have the pedal end thereof swung downwardly and forwardly to the position shown in FIGURE 4 and the release lever will rise to the position shown in FIGURE 4 where the pedal 72 will be elevated. Also this rearward swinging of the legs will cause the spring 50 to be stretched or put under tension and the pivot 80 will have swung upwardly past the center of the pivot 78 so that the levers will maintain the position shown in FIGURES 2 and 4. The wheels of the carriage will thus be elevated from the ground and the carriage will be locked in the stationary position.

The lowering of the wheels is effected by pressing downwardly on the release lever pedal 72 which action will effect a forward thrust against the bar 62 and this together with the action of the tensioned spring 50 will cause the legs to swing forwardly and upwardly and thus lower the wheels onto the underlying surface.

FIGURES 6, 7, and 8 illustrate a modified leverage unit structure which is generally designated 86. This modified or second embodiment of the leverage unit includes a lever bracket 88 corresponding to the bracket 66, and mounted upon the rear axle 26 as shown. The thrust bar 90 which, as in the first described form of the mechanism, extends across the width of the chassis and connects thrust links 92, to the rear ends of which the rear pivotally mounted legs 94 are attached, has secured thereto the forwardly directed end portion 96 of the lever 98 which is bent intermediate its ends to form an obtuse angle corresponding to the angles release lever 68. The other end of this lever 96 extends upwardly and rearwardly with respect to the bar 90 as shown and forms one part of a toggle joint, the other or second part of the joint consisting of a pair of parallel links 100, the pair being connected at one end by the pivot 102 with the rearward end of the lever 98 and at the other end being connected by the pivot 104 with the rear end of the fixed lever bracket 88.

While a pair of links 100 is preferably employed for coupling the rearward end of the lever 98 with the end of the bracket 88, obviously a single link may be employed if desired.

The numeral 106 designates a main lever or arm which is pivotally attached as at 108, intermediate its ends, to the lever bracket 88. This lever 106 is of sufficient length to extend downwardly across one side of the end portion 96 of the angled lever 98 and it is disposed across and engages, or is free to engage, the forward side of a pin 110 carried by and projecting laterally from the side of the end 96 of lever 98.

It will be seen that in both embodiments of the invention a toggle joint coupling between the lever bracket 66 or 88 and the thrust bar 62 or 90 is instrumental in effecting the actuation of the legs to lock the carriage wheels, or to act as a brake for the carriage structure, when the legs are positioned vertically and in contact with the underlying surface, or to release the holding action to lower the wheels onto the underlying surface, when proper thrust is applied to the leverage unit to open or close the toggle joint.

In the structure shown in FIGURES 1 to 5 the toggle joint embodies the rear end portion of the lever 76 and the rear portion of the lever 68, such portions being pivotally connected together at 80 and in the second embodiment the toggle joint comprises the link or links 100 and the rear end portion of the angled lever 98.

In the second embodiment of the invention the main lever has a portion extending above the pivot 108 and preferably carries a cap or head 112 against which the foot may be applied. When the toggle joint embodying the elements 98 and 100 is open or straightened out as shown in FIGURE 8, the legs 94 at the rear of the chassis and those at the forward end, not shown, will be elevated as the legs 34 and 36 are shown in FIGURE 3. When a forward thrust is applied to the head 112 of the main lever 106, the lower end of the lever will be forced rearwardly against the pin 110 and this will tend to break the toggle joint bringing the links 100 and the rear end of the lever 98 into closed relationship and extending upwardly and rearwardly as shown in FIGURES 6 and 7. The legs will then be moved to vertical position against the resistance of the spring 114 which is connected, like the spring 50, between the forward side of a leg 94 and a forward point on the chassis frame.

For the release of the legs from the vertical position to be returned to the raised position by the action of the spring 114 and pressure applied to the toggle joint, the foot is pressed down against the upwardly projecting parts of the closed toggle joint, at the pivot point 102 and when this pivot passes the center of the pivot 104 the spring will take over and pull the legs into elevated position.

From the foregoing it will be seen that there is provided by the present invention, a novel brake means for the wheels of a baby carriage or similar wheeled vehicle, where the wheels will be removed from the underlying support and the vehicle will be maintained firmly against the supporting legs so that it cannot be shifted in any direction or tipped over with any degree of ease. The mechanism in both of its forms is easily and quickly actuated by the foot of the operator of the carriage to effect the desired locking of the structure or its release.

As this invention may be embodied in several forms without departing from the spirit or essential characteristics thereof, the present embodiment is therefore illustrative and not restrictive, since the scope of the invenion is defined by the appended claims rather than by the description preceding them, and all changes that fall within the metes and bounds of the claims or that form their functional as well as conjointly cooperative equivalents, are therefore intended to be embraced by those claims.

I claim:

1. In a wheeled vehicle of the character described, a body supporting chassis having longitudinal side frame members, transverse axles and wheels on said axles, antitip and brake mechanism comprising a front pair of ground engaging members spaced apart transversely of the chassis and each having an upper end pivotally attached to a side frame member, a rear pair of ground engaging members spaced apart transversely of the chassis and each having an upper end pivotally attached to a side member, connecting means between said front and rear members forming therewith a unit, said unit being shiftable for swinging said members into and out of ground engaging position, a thrust bar extending transversely of the rear of the chassis and operatively connected with said unit, a bracket rigidly secured to the chassis near axle and projecting rearwardly therefrom, a lever mechanism coupled to and forming a toggle joint connection between said bracket and said thrust bar, said toggle joint being adapted when straightened to impart thrust to said thrust bar and effect shifting of said unit to swing said members out of ground engaging position and the toggle joint when folded reversely shifting said unit to swing said members into ground engaging position, and means for facilitating the straightening and folding of said toggle joint by foot pressure.

2. The invention as defined by claim 1, wherein one element of the toggle joint has a portion extending beyond the knee of the joint and carries a pedal, a pedal carried by the other element of the joint, said pedals forming the said means for facilitating the said straightening and folding of the joint.

3. The invention according to claim 1, wherein said ground engaging members are of a length to elevate and support the chassis with the wheels disengaged from the underlying surface, when in vertically disposed ground engaging position.

4. In a wheeled vehicle of the character described, a body supporting chassis having longitudinal side frame members, transverse axles and wheels on said axles, antitip and brake mechanism comprising a front pair of ground engaging members spaced apart transversely of the chassis and each having an upper end pivotally attached to a side frame member, a rear pair of ground engaging members spaced apart transversely of the chassis and each having an upper end pivotally attached to a side member, connecting means between said front and rear members forming therewith a unit, said unit being shiftable for swinging said members into and out of ground engaging position, a thrust bar extending transversely of the rear of the chassis and operatively connected with said unit, a bracket rigidly secured to the chassis rear axle and projecting rearwardly therefrom, a first lever element having an elongate body terminating in an obtusely angled portion secured to said thrust bar, the body portion extending upwardly and rearwardly from the bar and terminating in a laterally projecting pedal, a second lever element having an end pivotally attached to the body of the first lever between said pedal and said obtusely angled portion, the second lever having pivotal attachment intermediate its ends to the bracket above said bar, said levers forming a toggle joint in which the knee is at the said pivotally attached end of the second lever with the first lever, said second lever extending downwardly and forwardly from its pivotal attachment to the first lever when the said unit is in the position in which the ground engaging members are vertical and in engagement with the ground, and said toggle joint being straightened to move the unit forwardly and disengage said members from the ground when downward pressure is applied to the pedal of the first lever.

5. The invention according to claim 4, with spring means coupling a rear ground engaging member with a forward part of a side frame member and biased to urge forward shifting of the unit to swing the ground engaging members away from the ground.

6. In a wheeled vehicle of the character described, a body supporting chassis having longitudinal side frame members, transverse axles and wheels on said axles, antitip and brake mechanism comprising a front pair of ground engaging members spaced apart transversely of the chassis and each having an upper end pivotally attached to a side frame member, a rear pair of ground engaging members spaced apart transversely of the chassis and each having an upper end pivotally attached to a side member, connecting means between said front and rear members forming therewith a unit, said unit being shiftable for swinging said members into and out of ground engaging position, a thrust bar extending transversely of the rear of the chassis and operatively connected with said unit, a bracket rigidly secured to the chassis rear axle and projecting rearwardly therefrom, a toggle joint comprising two elongate parts pivotally connected together, an outer end of one part being pivotally attached to said bracket, the other part of said joint having its outer end continued in an elongate obtusely angled portion and secured to said thrust bar, an elongate lever disposed across said bracket and pivotally attached thereto and extending downwardly therefrom across the said elongate portion of said other part of the toggle joint and extending upwardly above the bracket, and means forming a fulcrum on said elongate portion against which said lever engages when turned in one direction on its pivot to break the toggle joint and actuate it from a straightened out condition to a folded condition and effect shifting of the unit to swing the ground engaging members into ground engaging position.

7. The invention as defined by claim 1, wherein said connecting means between the said front and rear ground engaging members comprises resilient bar members formed to have a slight upward flexing between their ends under longitudinal thrust.

8. The invention as defined by claim 1, wherein said connecting means between the said front and rear ground engaging members comprises bar members and a short arm having one end fixed to and extending substantially at right angles from each of the front ground engaging members adjacent to the pivot attachment of the latter to the adjacent side frame member, said short arms extending rearwardly from their respective ground engaging members when the latter are in substantially vertical operative position, and each of said bar members has a forward end pivotally attached to the opposite end of an adjacent short arm.

9. The invention as defined by claim 8, wherein each of said short arms has a lateral extension at the said opposite end thereof forming a stop means engageable with the adjacent side frame member to limit downward and forward swinging of the adjacent ground engaging leg.

10. The invention according to claim 8, wherein said bar members are resilient and are bent upwardly slightly approximately midway between their ends to have a slight upward flexing under longitudinal thrust.

References Cited by the Examiner

UNITED STATES PATENTS

| | | | |
|---|---|---|---|
| 1,715,555 | 6/1929 | Jackson | 188—20 |
| 1,824,484 | 9/1931 | Jackson | 188—20 |

FOREIGN PATENTS

| | | |
|---|---|---|
| 597,189 | 1/1948 | Great Britain. |

WILLIAM FELDMAN, *Primary Examiner.*

O. M. SIMPSON, *Examiner.*